Figure 1:
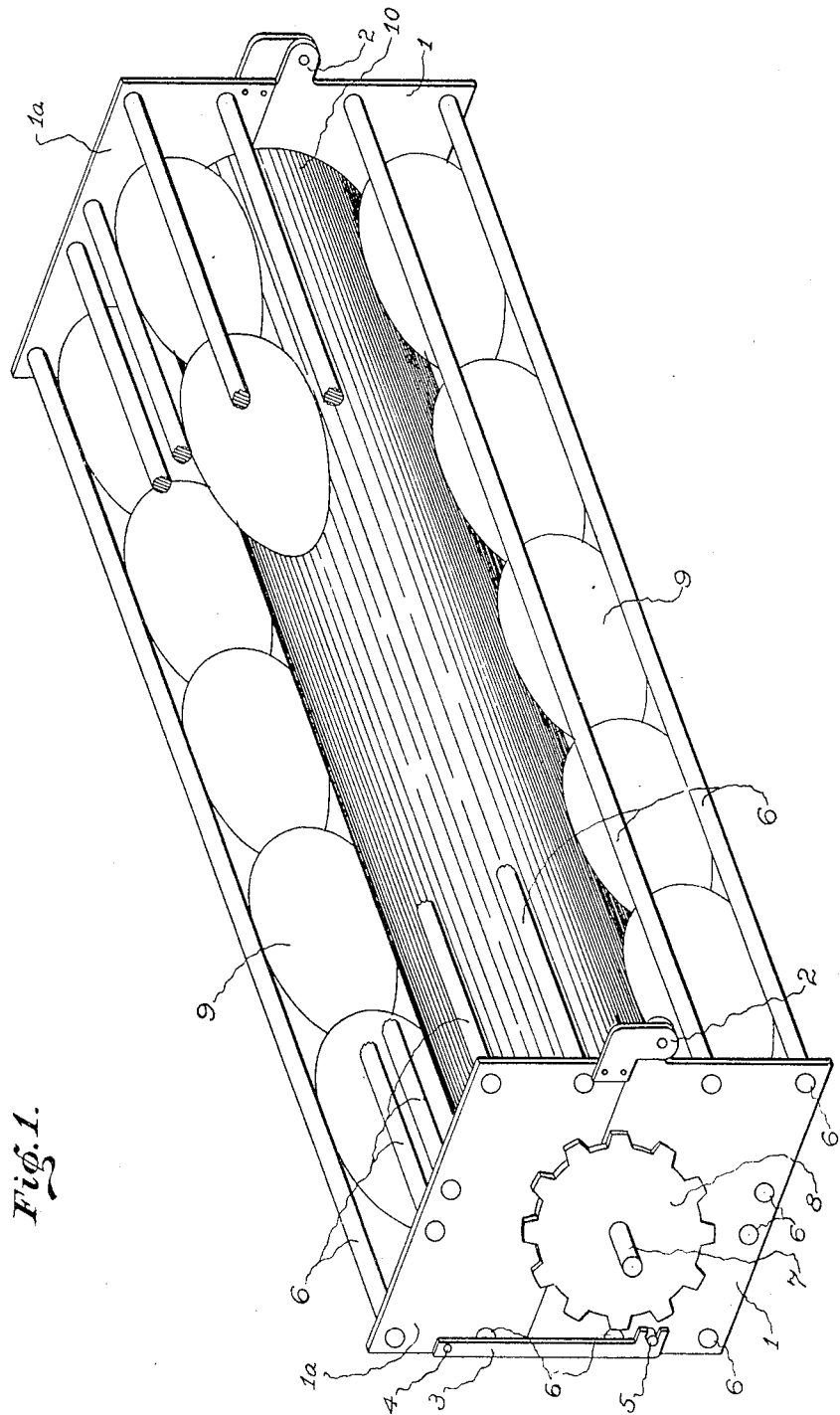

D. A. CALLAWAY.
DEVICE FOR ROTATING EGGS IN INCUBATORS.
APPLICATION FILED DEC. 6, 1907.

No. 927,709.

Patented July 13, 1909.
2 SHEETS—SHEET 1.

Witnesses.
Geo. L. Walker
J. E. Walker

Inventor
David Abram Callaway

D. A. CALLAWAY.
DEVICE FOR ROTATING EGGS IN INCUBATORS.
APPLICATION FILED DEC. 6, 1907.
927,709.
Patented July 13, 1909.
2 SHEETS—SHEET 2.
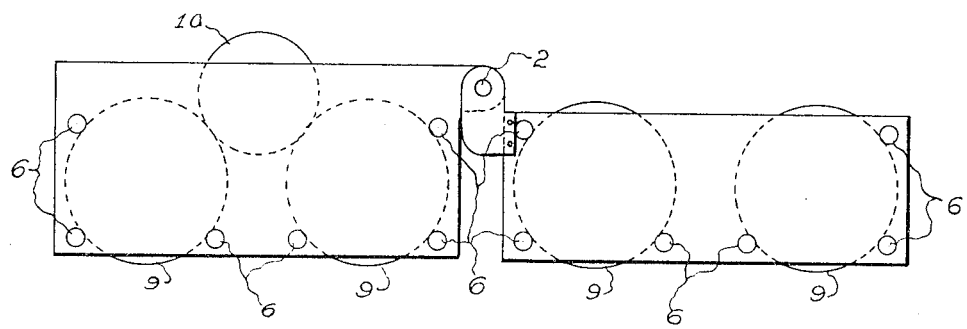
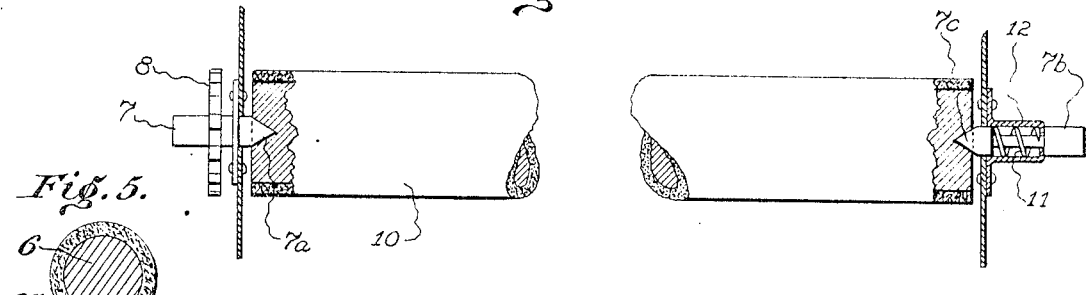
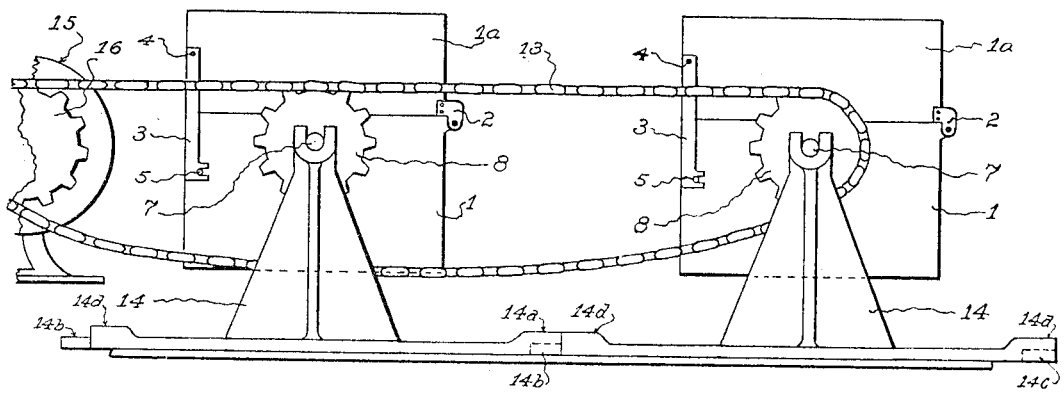
Witnesses.
Geo L Walker
S. E. Walker
Inventor.
David Abram Callaway

UNITED STATES PATENT OFFICE.

DAVID ABRAM CALLAWAY, OF PUEBLO, COLORADO, ASSIGNOR OF ONE-THIRD TO H. G. DE TIENNE AND ONE-THIRD TO LYMAN I. HENRY, OF PUEBLO, COLORADO.

DEVICE FOR ROTATING EGGS IN INCUBATORS.

No. 927,709.     Specification of Letters Patent.     Patented July 13, 1909.

Application filed December 6, 1907. Serial No. 405,363.

*To all whom it may concern:*

Be it known that I, DAVID ABRAM CALLAWAY, a citizen of the United States, residing at Pueblo, in the county of Pueblo and State of Colorado, have invented a new and useful Improvement in Devices for Rotating Eggs in Incubators, of which the following is a specification.

My invention relates to devices for rotating eggs in incubators in which a rectangular frame composed of end pieces in two parts hinged together and connected by felt covered rods, adapted to hold eggs while being rotated, the eggs being held outwardly against the framework by a felt covered cylinder suspended in the middle of the framework at its ends; and the objects of my invention are,—first, to provide a cheap and effective means for constantly rotating eggs within an incubator by means of motor power; second, to provide such rotating means in such form that one or more rotating devices may be operated in an incubator by one motor; third, to provide such rotating device to be applied to any ordinary incubator now in use without altering the heating or moisture applying apparatus, or any part of the same; fourth, to provide such a rotating device that provides for proper ventilation of the eggs while being rotated; and fifth, to provide such rotating device to minimize the attention necessary to be given to the eggs during incubation. I attain these objects by the mechanisms illustrated in the accompanying drawings, in which;—

Figure 1 is a perspective view, in partial broken section, apart from an incubator or motor, of my invention, with the eggs shown in proper position to be rotated; Fig. 2 is a conventional elevation of one end of my invention showing the framework opened for filling with eggs or to remove them; Fig. 3 is a side elevation of a portion of the end pieces and the felt covered cylinder in broken section, showing manner of applying the latter, and the trunnions on which the device rotates; Fig. 4 is an end elevation of two rotating devices as they will appear mounted on bearings to be rotated by sprocket chain. Fig. 5 is a cross sectional view of rod 6, showing felt covering $6^a$.

Similar numbers refer to similar parts throughout the several views.

The frame shown in Fig. 1 is composed of two rectangular frames hinged together. The lower frame is composed of end pieces 1 that are held together by rods 6, which may be covered with a soft material, such as felt. The upper frame is composed of end pieces $1^a$ that are held together by rods 6. The two frames are hinged at 2 and when closed together as in Fig. 1, are held by hook 3, which is pivotally attached to end pieces $1^a$ by rivets 4 and engages end pieces 1 at pins 5. To fill with eggs the frame is opened, as shown in Fig. 2, and the eggs 9 laid in on rods 6, whereupon the felt covered cylinder 10 is placed first on pivot $7^a$ of trunnion 7, which carries sprocket wheel 8, and trunnion $7^b$ is pulled outwardly until the cylinder 10 is properly centered, when pivot $7^c$ enters a suitable hole in cylinder 10, and is held securely by spring 11, which is held in housing 12. The cylinder 10 will hold the eggs so they will not fall out while the frame is being closed and hooked by hook 3, whereupon the eggs 9 are held by cylinder 10 out against rods 6. The frame thus filled with eggs is set in suitable bearings 14, in which as many rotating devices may be operated by one motor as the space in the incubator will accommodate. To facilitate in spacing the bearings apart and to keep them in line and from moving out of proper alinement, the base of the bearing stands 14 are provided with a dovetail connection. The tongue $14^b$ of end $14^d$ enters a notch $14^c$ of end $14^a$, each base having a tongue on one end and a notch on the other. By means of this tongue and notch arrangement it may be seen that either an upward or sidewise movement of the rearmost stand will be held by the next stand; therefore this manner of connection tends to produce a solid base when the tongues and notches are properly fitted. The chain 13 engages the sprocket wheel 8 as shown in Fig. 4, and a sprocket wheel 16 on any suitable motor 15, or clock mechanism, which is constructed to move the chain slowly in such manner that the rotating devices will be turned once around in twenty-four hours, or as many times around as desired in a given time. It may be seen that the arrangement of these mechanisms provides for rotating one or more of my devices at one time by one source of power; and that one or more of the rotating devices may be applied to any ordinary incubator in the heated portion usually occupied by egg trays and that the eggs will be thoroughly ventilated by passing circuitously through the air in the heated chamber of the incubator; and that the eggs need no attention during incubation except the last day or two when the frames may be opened as shown in Fig. 2, and placed on the bottom of the incubator much the same as are egg trays of the ordinary kind, so the chicks may be free to leave the egg shells. The stands 14 may be removed from the incubator when the frames are opened.

My invention is particularly adapted to be applied to incubators without altering the heating or moisture supplying devices therein, or any part of the incubator; and is particularly useful in saving time heretofore employed in turning the eggs, and useful in producing strong, healthy fowls, since the rotation of the eggs, being continuous, brings the life giving parts of the eggs into complete contact with each other.

Not confining myself to the kind of motor for furnishing power to rotate my invention, nor to the manner of connecting the same to it by sprocket chain, gears, or by attaching a motor to each rotating device on trunnions 7.

What I claim as new and desire to secure by Letters Patent is—

1. In a contrivance of the character described for rotating eggs in an incubator, a rectangular frame, composed of felt covered rods and two end pieces connected therewith, each end piece composed of two parts hinged together whereby said frame may be opened and closed, a trunnion on each of such end pieces, a sprocket wheel on one of said trunnions, a removable cushioned cylinder centrally disposed within said frame adapted to hold eggs outwardly against said cushioned rods.

2. In a contrivance of the character described for rotating eggs in an incubator, a combination of an egg containing frame having trunnions on each end, a sprocket wheel on one of said trunnions, and a plurality of bearing stands spaced apart having therein bearings adapted to receive operatively said trunnions and carrying a plurality of said egg containing frames, bases on said bearing stands, each of said bases provided with a notch in one end and a tongue in the other and adapted to interengage to secure rigidity and relative spacing of bearing stands for operating collectively, by any suitable motive power, any desired number of egg containing frames, all substantially as set forth.

In testimony whereof I have signed my name to this specification in the presence of two subscribing witnesses.

DAVID ABRAM CALLAWAY.

Witnesses:
LYMAN I. HENRY,
S. MAUDE ENGLE.